United States Patent [19]

Adan et al.

[11] Patent Number: 4,794,523
[45] Date of Patent: Dec. 27, 1988

[54] CACHE MEMORY ARCHITECTURE FOR MICROCOMPUTER SPEED-UP BOARD

[76] Inventors: Manolito Adan, 3545 S. Jasmine, Los Angeles, Calif. 90034; Steven Meadows, 4345 - 154th St., Lawndale, Calif. 90260; Robert McCaslin, 1227 Coldwater Canyon, Beverly Hills, Calif. 90210

[21] Appl. No.: 782,664

[22] Filed: Sep. 30, 1985

[51] Int. Cl.[4] ............................................. G06F 9/28
[52] U.S. Cl. ................................................. 364/200
[58] Field of Search .............................. 364/200, 900

[56] References Cited

U.S. PATENT DOCUMENTS

| | | | |
|---|---|---|---|
| 4,104,725 | 8/1978 | Rose et al. | 364/900 |
| 4,304,497 | 12/1981 | Cavill et al. | 364/900 |
| 4,442,487 | 4/1984 | Fletcher et al. | 364/200 |
| 4,484,273 | 11/1984 | Stiffler et al. | 364/200 |
| 4,504,902 | 3/1985 | Gallaher et al. | 364/200 |
| 4,516,199 | 5/1985 | Frieder et al. | 364/200 |
| 4,523,297 | 6/1985 | Ugon | 364/900 |
| 4,528,626 | 7/1985 | Dean et al. | 364/200 |
| 4,545,023 | 10/1985 | Mizzi | 364/900 |
| 4,556,953 | 12/1985 | Caprio et al. | 364/900 |
| 4,648,034 | 3/1987 | Heninger | 364/200 |

OTHER PUBLICATIONS

MC68020 32–Bit Microprocessor User's Manual, 2nd Ed, 1984, 1985 Prentice Hall, Inc., Englewood Cliffs, N.J. pp. 1–2, 7-1-7-4.

Verebély, P. "GD80–Multiprocessor Architecture for Computer Graphics" Euromicro Journal 6 (1980) pp. 406–409.

Primary Examiner—Raulfe B. Zache
Assistant Examiner—Eric Coleman
Attorney, Agent, or Firm—Townsend & Townsend

[57] ABSTRACT

A method and apparatus for enhancing the speed of operation of a computer consists of providing a cache memory which is faster than the computer's main memory, disabling the computer's main microprocessor, and replacing it with a microprocessor with a faster clock cycle time. A portion of the program stored in the main memory is stored in the cache memory. The addresses of the portion of the main memory stored in the cache memory are noted in a tag RAM. Upon each addressing sequence during the execution of a program, the tag RAM is examined to determine if the addressed located is stored in the cache memory. If the stored location is identified in the tag RAM, it is retrieved from the cache memory at high-speed. Otherwise, the data in the address location is retrieved from main memory at a slower speed and written into the cache memory so that subsequent accesses may be made at high-speed.

16 Claims, 4 Drawing Sheets

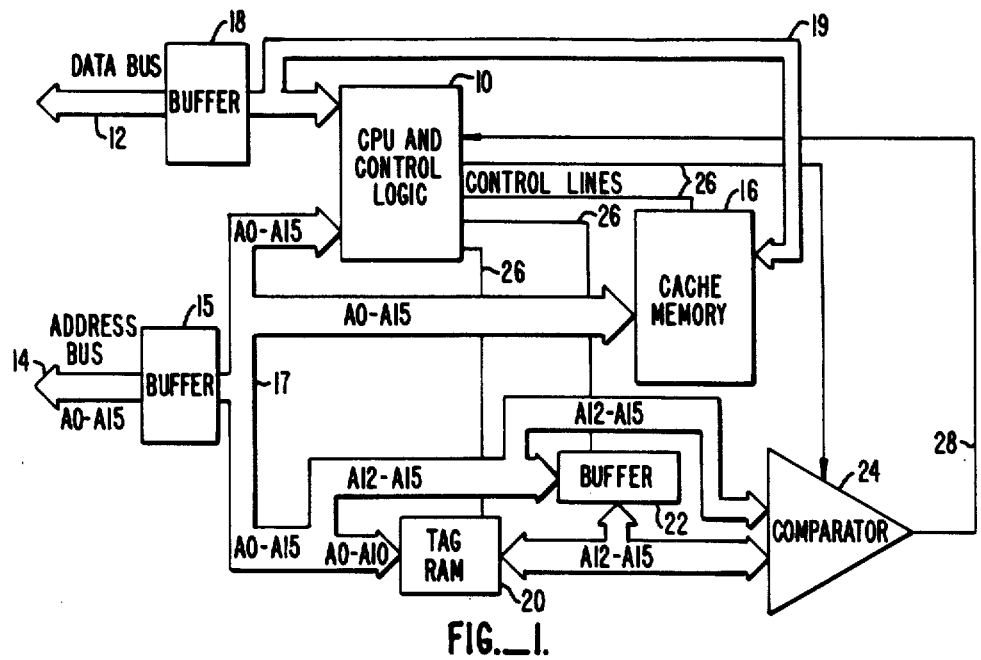
FIG._1.
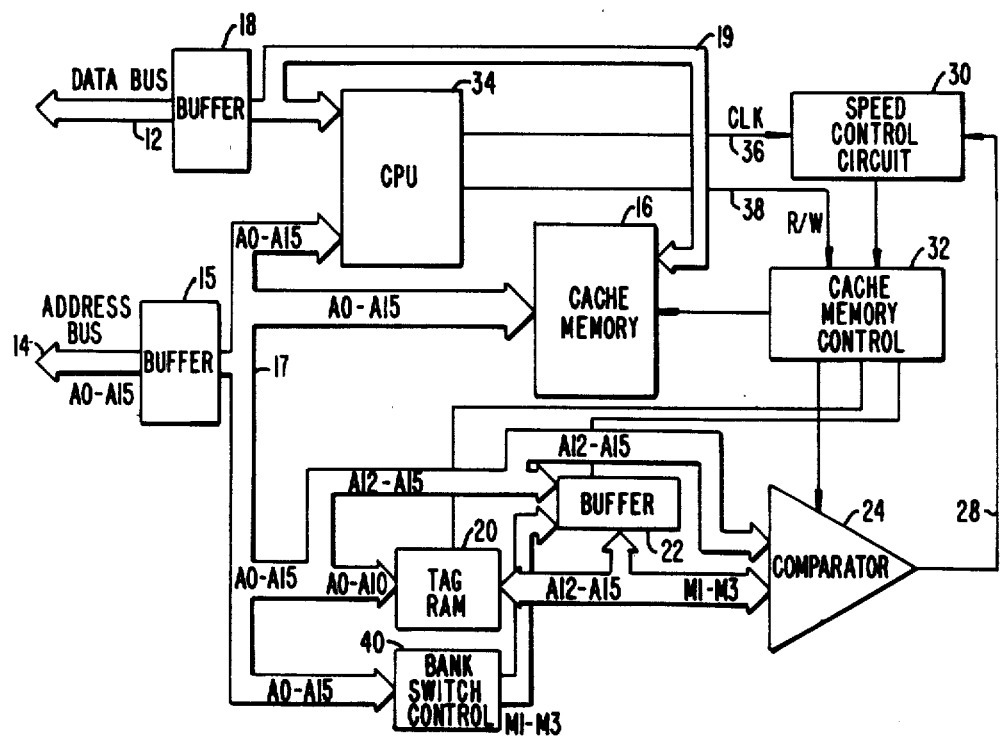
FIG._2.

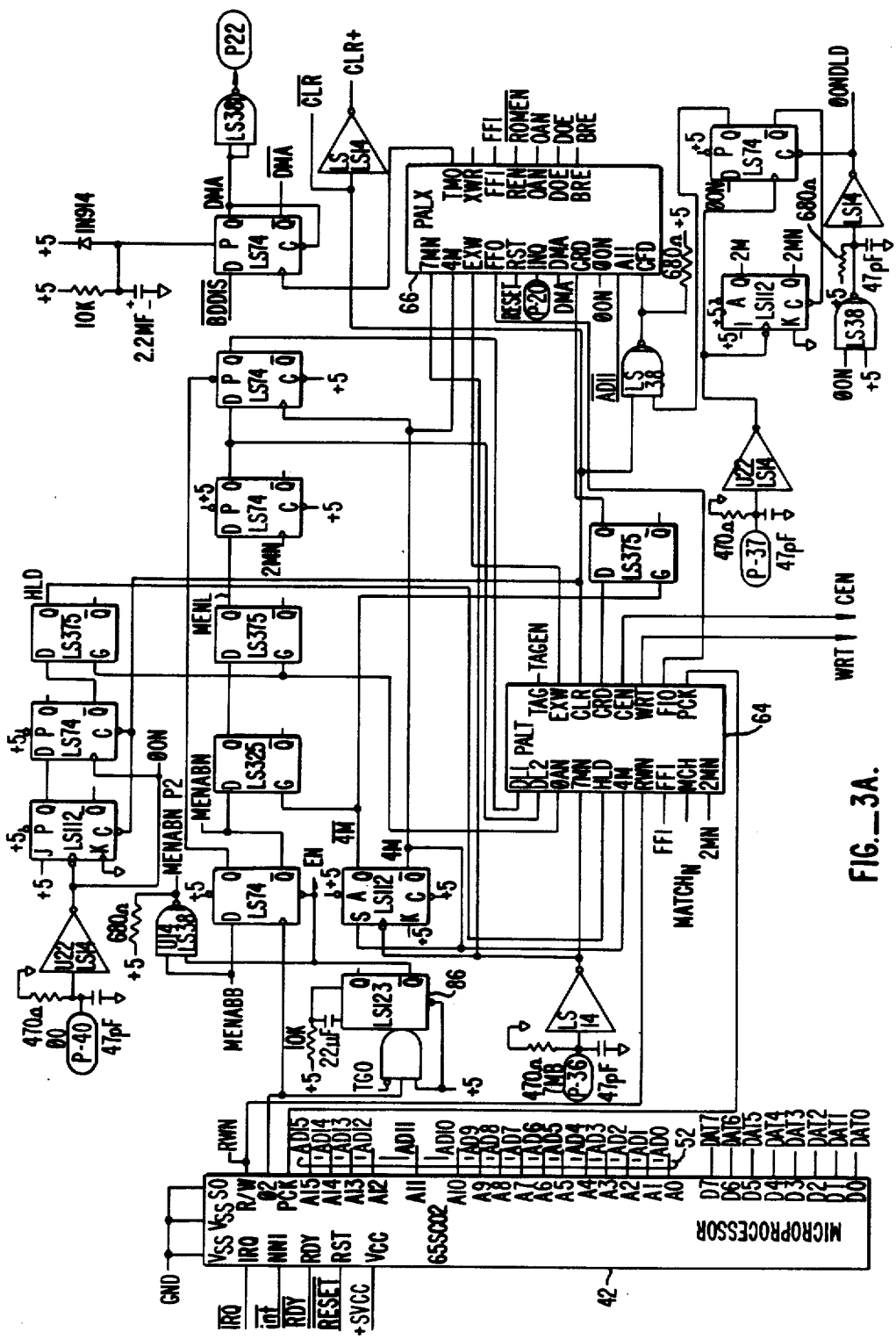
FIG._3A.

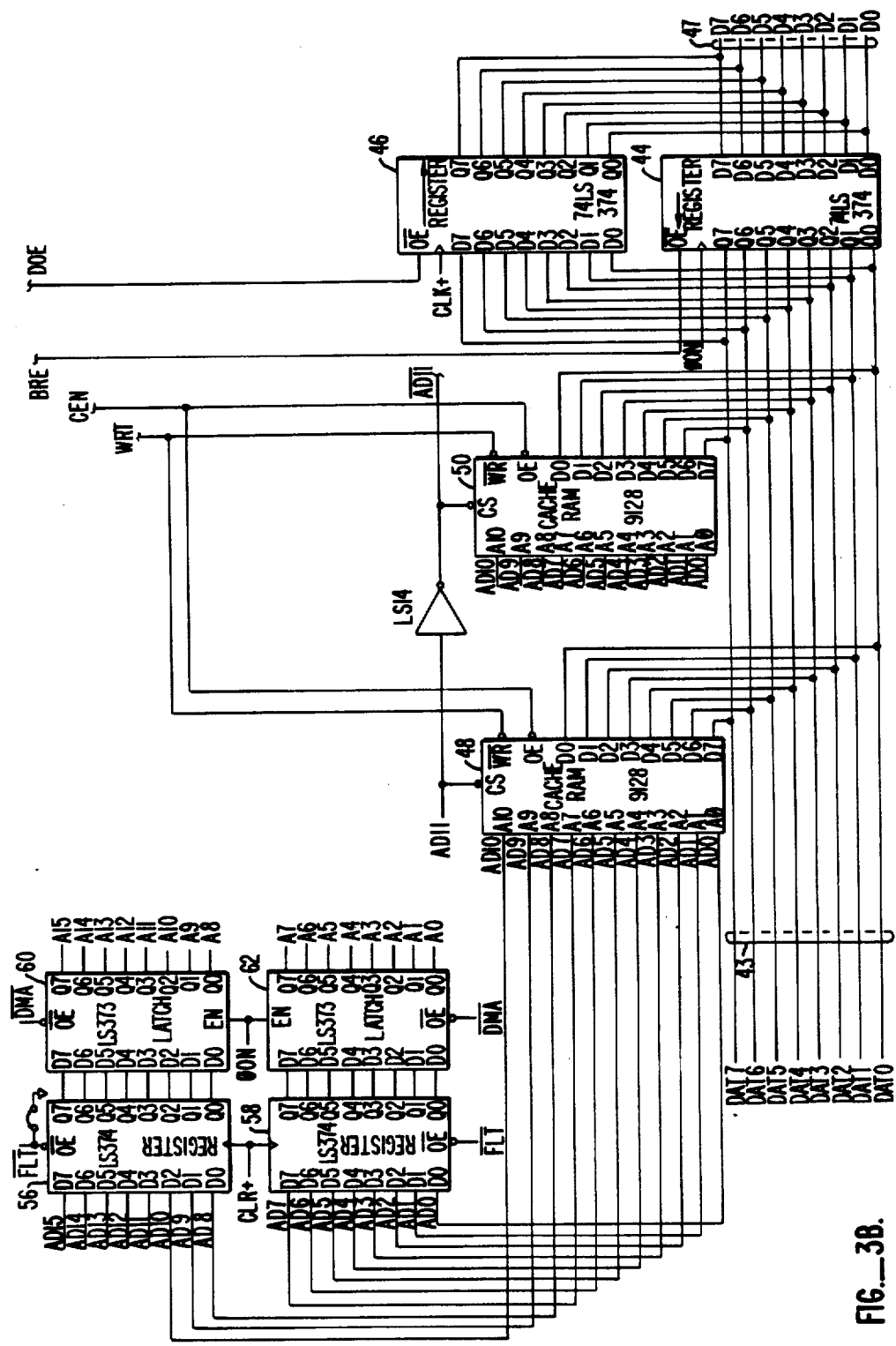
FIG._3B.

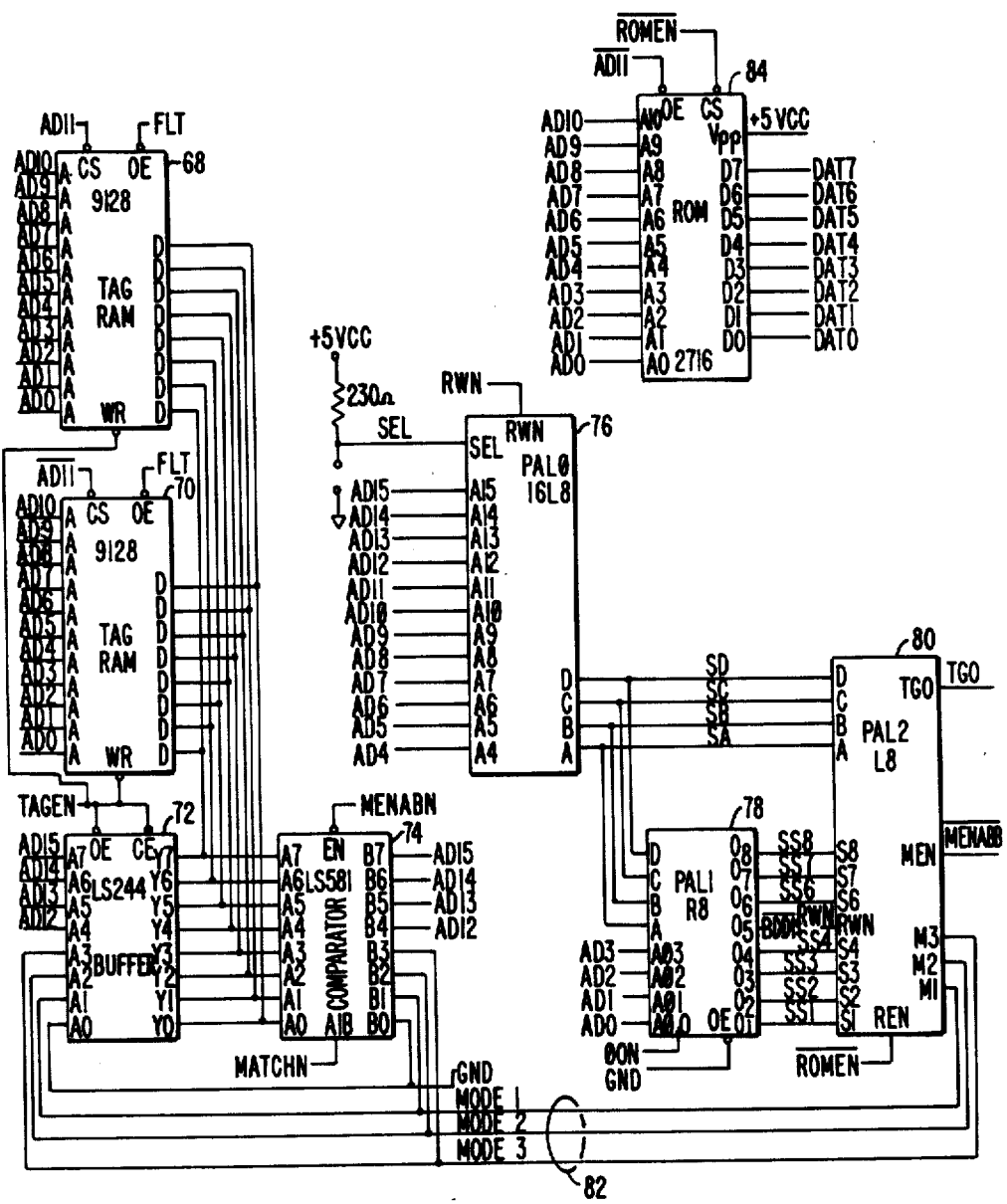
FIG._3C.

CACHE MEMORY ARCHITECTURE FOR MICROCOMPUTER SPEED-UP BOARD

BACKGROUND OF THE INVENTION

The present invention relates to fast add-on memory for microcomputers.

Cache memory is a computer memory design concept which has been used for mainframe computers for several years. The concept is to have two separate memories for the same machine, a main memory which is large and medium speed and a cache memory which is small and fast. The software is loaded into the main memory and then sections of it are loaded into the cache memory as required for the central processing unit (CPU) to process. The purposes of this arrangement is to increase the processing speed of the computer without requiring the entire main memory to be of high-speed which can be very expensive. The cache memory in such mainframe computers are typically hard-wired into the computer and the internal CPU decides which operations should use cache memory and which operations should use the slower main memory.

Speed-up memory cards have been designed for microcomputers which have a high-speed processor and high-speed random access memory (RAM). Such cards have served to disable the processor in the microcomputer and replace the processor and RAM in the microcomputer with that on the memory card. However, the replacing of the entire memory with high-speed RAM can be very expensive due to the cost of such high-speed RAM.

SUMMARY OF THE INVENTION

The present invention is a method and apparatus for enhancing the speed of operation of a computer. A cache memory which is faster than the main memory of a computer is provided. A portion of the program stored in the main memory is stored in the cache memory. The addresses of the portion of the main memory stored in the cache memory are noted in a tag RAM. Upon each addressing sequence during the execution of a program, the tag RAM is examined to determine if the addressed location is stored in the cache memory. If the stored location is identified in the tag RAM, it is retrieved from the cache memory at high-speed. Otherwise, the data in the address location is retrieved from main memory at a slower speed and written into the cache memory so that subsequent accesses may be made at high-speed.

In the normal operation of any microcomputer, the software to be executed is down-loaded from disc storage into the computer's memory (called "main memory"). The microprocessor on the computer then begins to execute the software out of main memory with the speed of execution controlled by the speed of the microprocessor, which is in turn controlled by a clock signal. The clock signal speed is set so that it will not exceed the operating speed of the logic and memory chips in the computer. For economy of costs microcomputers do not use the fastest chips available for the main memory.

The cache memory design of the present invention utilizes a high-speed microprocessor and high-speed memory. Small portions of the software from main memory are copied into the cache memory which are then executed from cache memory using the high-speed microprocessor. When a card containing the present invention is plugged into a computer, the microprocessor resident in the computer will be disabled by the power-up of the board of the present invention. Since only small portions of the software are cached at any one time, the cache memory can be a small fraction of the size of main memory, thereby reducing its cost.

Each byte of software placed in the cache memory is tagged with a byte in the tag RAM. The byte in the tag RAM records which section of main memory it came from. Thus, for example, where the cache memory has 4K, the main memory is divided into 4K blocks with a 4K tag RAM simply recording which of the 4K blocks a particular address in the cache memory came from. When the microprocessor addresses the next byte of instruction to execute, a cache memory control logic first checks the tag RAM to determine if the byte to be fetched is in cache memory. If it is, the byte is executed from the cache memory at high-speed. If it is not, the microprocessor is shifted to a low speed to execute the instruction out of main memory, while simultaneously copying it into the cache RAM.

This caching process means that when the processor is to make, say, ten iterations through a loop that is not in cache memory, the first iteration will be executed from a main memory at slow speed and the successive nine iterations will be executed from a cache memory at high-speed. Thus, the execution speed of software using the present invention will vary depending upon how the software is designed. If the software consists of often repeated loops, most execution time will be from a cache memory at high-speed. Typical software execution spends approximately 80% of its time executing out of cache memory.

The present invention also contains write-through logic which allows an address to be written to be stored in a buffer at high-speed and thereafter entered into main memory at slow speed speed without slowing down the operation of the fast microprocessor. The main microprocessor of the computer is also uniquely disabled through use of the direct memory access (DMA) line which is activated to inhibit the main microprocessor and take over operation of the computer.

The present invention can be applied to many different microcomputers, including the IBM and APPLE microcomputers. The APPLE microcomputer contain "soft switches" which are combinations or codes of certain addresses which indicate that certain locations are to be accessed. The soft switches determine how and which memory is to be accessed. For example, the computer may have ROM and RAM which reside at the same memory address. A soft switch will determine if the processor is to access the ROM or the RAM. Accordingly, by using programmable array logic (PAL), these codes can be decoded to provide indication of which memory location is to be accessed and cached. This decoded value is then stored in the tag RAM along with the identification of the 4K block in memory. When soft switches are turned on and off, the PAL circuitry mirrors this information so that the speed-up card knows the current mode of the computer.

The present invention, through its unique ability to disable the main microprocessor using the DMA line and its use of the tag RAM, is able to provide fast operation using only a small high-speed memory. Thus, the large expense of replacing the entire main memory with high-speed memory as in prior art memory speed-up cards is avoided.

BRIEF DESCRIPTION OF THE DRAWINGS

FIG. 1 is a block diagram of a preferred embodiment of the present invention;

FIG. 2 is a block diagram of the embodiment of FIG. 1 adapted for an APPLE computer; and FIGS. 3A-3C are schematic diagrams of the embodiment of FIG. 2.

DETAILED DESCRIPTION OF THE PREFERRED EMBODIMENTS

FIG. 1 is a block diagram of a preferred embodiment of a memory speed-up board according to the present invention. CPU and control logic 10 is coupled to a data bus 12 and an address bus 14. A cache memory 16 receives addresses from bus 14 through a buffer 15 and data from data bus 12 through a buffer 18. A tag RAM 20 is addressed by address bits A0-A10 from address bus 14 and stores address bits A12-A15 which are input through a buffer 22. The address bits A12-A15 stored at a particular location in tag RAM are compared with bits A12-A15 of a current address by a comparator 24. CPU 10 controls the operation of the various components of the board through a number of control lines 26.

In operation, after the board of the present invention is plugged into a computer, it is powered up and disables the computer's main microprocessor. Instructions are then executed at fast speed using a fast microprocessor in CPU 10. Whenever an address appears on address bus 14, bits A0-A10 of that address are input to tag RAM 20 which produces an output to comparator 24 consisting of the bits A12-A15 stored in the tag RAM. These bits A12-A15 identify the particular 4K block of memory which is stored in cache memory 16. If this 4K block does not match the 4K block identified by address bits A12-A15 of the current address, comparator 24 would indicate no match on output line 28 to CPU 10. CPU 10 will then switch to a slow speed and access the address from the computer's main memory. This address will then be stored in cache memory 16 and the 4K block identifying its location will be stored in tag RAM 20. The next time this particular address is executed, comparator 24 would indicate that it is stored in cache memory and CPU 10 will execute such address out of cache memory 16 at high-speed.

FIG. 2 is a block diagram of the embodiment of FIG. 1 adapted for an APPLE microcomputer. In addition to the elements of FIG. 1, a speed control circuit 30 and a cache memory control circuit 32 have been separated out from CPU 10 of FIG. 1 and perform the functions of the control logic in CPU 10 of FIG. 1. Speed control circuit 30 provides a clock signal 36 determining the microprocessor speed. CPU 34 provides a read/write signal 38 to cache memory control circuit 32. Speed control circuit 30 and cache control circuit 32 then control the operation of the remaining elements of the system.

A bank switch control 40 is provided to receive addresses A0-A15 and to decode the addresses to produce a three-bit word M1-M3, which, in conjunction with the current soft switch settings, determine the exact source of a single byte of memory. Such a soft switch is a particular address which indicates that a particular memory location of the main memory is to be accessed, i.e., auxiliary memory, ROM, RAM, etc. This additional address information M1-M3 is also processed through buffer 22 and stored in tag RAM 20. For a microcomputer which does not use soft switches, such as the IBM microcomputers, instead of a bank switch control 40, additional tag RAM 20 is provided to cover all the address locations. The operation of the system of FIG. 2 is otherwise as set forth for the system of FIG. 1.

FIGS. 3A-3C are schematic diagrams of a circuit implementing the embodiment of FIG. 2. A fast microprocessor 42 has its data lines coupled to a fast internal data bus 43 for data bits DAT0-DAT7. This internal data bus is coupled through registers 44, 46 to the slower main microcomputer bus on the APPLE computer for data bits D0-D7. Register 44 is used to buffer information coming from the slower bus to the internal bus, while register 46 is used to buffer data going from the fast internal bus to the slower external bus. The internal data bits DAT0-DAT7 are also coupled to the data inputs of the fast cache RAM's 48 and 50.

The addresses of microprocessor 42 are coupled to a fast internal address bus 52 for address bits AD0-AD15. Fast address bus 52 is coupled to the address inputs of cache RAM's 48 and 50. The fast address bus 52 is coupled to the slower main microcomputer bus 54 for address bits A0-A15 by registers 56, 58 and latches 60, 62.

The remaining circuitry of FIG. 3A provides the various clock and timing signals through the use of a number of flip-flops and gates and PAL's 64 and 66.

Referring to FIG. 3C, tag RAM's 68 and 70 are provided with data through a buffer 72. Address bits AD1-2-AD15 of the current address and soft switch mode signals Mode1-Mode3 for the current address are compared to the contents of RAM's 68 and 70 (address bits A12-A15 and Mode1-Mode3) in comparator 74. PAL's 76, 78 and 80 decode the current address to produce a three-bit signal (Mode1-Mode3) on lines 82 based on the current soft switch settings.

In operation, on power-up, a ROM 84 does a dummy read to validate the system and fill the cache RAM with known values. If requested by the user, it also performs a self-test transfer from the APPLE minicomputer main memory and the APPLE resident ROM (read-only memory) and then disables itself and turns over control to microprocessor 42.

PAL circuits 76, 78 and 80 of FIG. 3C perform a straightforward decoding of the soft switches in the addresses. A signal RWN to PAL 76 is activated for certain APPLE addresses which are only meaningful when written to. An output signal TGO produced by PAL 80 is used for disk access which requires system operation to slow down. A one-shot 86 in FIG. 3A provides the required 15 millisecond (ms) delay. An output signal MENABB from PAL 80 indicates that the address decoded should not be read out of cache RAM's 48 and 50 because it corresponds to an I/O (input/output) slot or other memory which should not be cached (for example, bank switched memory as the tag cannot maintain the bank). Because it is an I/O slot, its contents might change and the cache RAM would not be aware of this change. Therefore, it must be updated for every addressing. A signal ROMEN input to PAL 80 and to ROM 84 is used to activate the ROM and deactivate PAL 80 upon power-up.

Referring now to FIG. 3A, registers 56, 58 and latches 60, 62 allow data to be written to the latches at high-speed with microprocessor 42 continuing on to the next instruction. Thereafter, the system can at its leisure, at the slower 1-megahertz (MHz) APPLE speed, write the data to the APPLE computer's main memory.

Microprocessor 42 will normally operate at 3.5 MHz, thereby giving it an optimum 3.5 times speed increase over the APPLE computer's resident microprocessor. Depending on how the software is written and how often repeat loops are performed, the execution speed will more typically be between 2.5 and 3.2 times faster than the normal APPLE execution speed.

The PAL's and the logic circuits of FIG. 3B provide the timing and control signals for the system. The functons of the signals operated on and produced by PAL's 64, 66 are set forth in Table I below.

TABLE I

PAL Control Signals

PAL 64

| | |
|---|---|
| PCK: | Processor Clock. Depending on the mode of the system (high speed or synchronous with slower APPLE clock) this clock will fluctuate between 1 MHz and 3.59 MHz. |
| WRT: | Cache write signal. Low when writing to Cache memory 48, 50. |
| CEN: | Cache output enable. Low when processor 42 is reading Cache memory 48, 50. |
| EXW: | External Write signal. Asserted when a write to the APPLE bus 47 is required. Propagates through to PALX where the actual APPLE write is synchronized. This signal initiates the process. |
| TAG: | Cache tag signal. This signal is asserted when cache RAM 48, 50 is written to. |
| CRD: | Cache read signal. This signal is asserted when cache RAM 48, 50 is read from. |
| FF0: | Timing signal flip-flop. This signal, combined with FF1, stops and starts PCK for transitions between synchronous 1 MHz operation and asynchronous 3.59 MHz operation. |
| CLR: | Initiates slow down of PCK from 3.59 MHz to 1 MHz. Also latches address and data into buffers 56, 58 and 46 for writes to the APPLE bus 47, 54 which are later enabled onto the APPLE bus during the next phase 0 clock cycle. If data is latched into the first stage buffers 56, 58 and 46 and a subsequent write occurs before the next phase 0, the processor will stop until the next phase 0 before CLR can latch the new data into the buffer. |
| DL1: | Used for synchronization during clock changes. No signals may be generated unless DL1 and DL2 are of the same state. When the clock rate is to change, these two signals will sequentially change states. Other signals in the PAL's look at these two signals to determine whether writes/reads are out of cache or the APPLE bus 47, 54. |
| DL2: | See DL1. |
| OAN: | Same as OAN on PAL 66. |
| 7MN: | Inverted 7.18 MHz clock from the APPLE bus. This clock is divided by two internally producing the 3.59 MHz clock used for high-speed operations. |
| HLD: | When CLR is generated, HLD holds CLR for one following phase 0 clock cycle. |
| 4M: | High speed clock. This is the divided by two versions of 7MN described above. This is actually a misnomer since the actual frequency present at this pin is 3.59 MHz. |
| RWN: | Read/Write signal output from microprocessor 42. |
| FF1: | See FF0. |
| MCH: | Match signal from comparator 74. This signal is asserted low by the comparator whenever tag memory 68, 70 matches the current requested memory byte. If the tag bits match, MCH may still be disabled if the location is not a valid cache location as determined by MENABN produced by MEN of PAL 80. |
| 2MN: | Used for proper synchronization of DL1 and DL2. |

PAL 66

| | |
|---|---|
| TMO: | Clock for disabling the system. This signal gates the BDDIS* signal from PAL 78 into a latch which completely removes the system from operation thus releasing all address and data lines. Allows the Direct Memory Access line (pin 22) on the APPLE bus to float high enabling the APPLE's normal 6502 microprocessor to operate. Any time pin 22 is low, the APPLE 6052 is completely disabled, floating all of its address and data lines which is the method in which the present system takes control of the APPLE. |
| XWR: | This signal takes the place of the normal APPLE WR* signal (pin 18 on the APPLE bus). When an actual write to the APPLE bus occurs, this signal drops low. This signal is disabled when DMA is not asserted. |
| REN: | ROM Enable: The presence of ROM 84 is indicated by the assertion of this signal and is only present while the system is determining the mode of operation. It disallows the system to cache memory from the high address space which is where the ROM image is initially located (thus overlaying the APPLE operating system ROM's). This is necessary since the cache RAM is undefined upon power-up and it allows the power-up software to define all of the cache before normal operation. After the cache initialization, the system creates a copy of itself in normal APPLE RAM at address $1000 (hex) and transfers execution to there. Normal operation starts, and this signal is asserted false, thus allowing the system to cache high memory. |
| DOE: | Data Bus Buffer Output Enable: This signal enables the data bus output buffers 44, 46 for writes to the APPLE bus 47. |
| BRE: | Data Bus Buffer Read Output Enable: For reads from the APPLE bus, this signal enables the output buffer. |
| OAN: | Maser Asynchronous 3.59 MHz clock which is derived by dividing the APPLE 7.18 MHz clock by 2. |
| FF1: | See FF1 of PAL 64. |
| 7MN: | See 7MN of PAL 64. |
| EXW: | See EXW of PAL 64. |
| FF0: | See FF0 of PAL 64. |
| RST: | Reset signal from APPLE bus. Causes the system to begin reading its on-board ROM 84 without caching memory, thus enabling the software to initialize the cache memory. |
| INQ: | I/OSTRB* signal from APPLE bus. REN is enabled by a reset and is held until this signal appears. |
| DMA: | Allows signals to be generated. When the system is disabled, this signal is asserted low causing outputs from this PAL to the APPLE bus to stop. |
| CRD: | Latched version of CRD from PAL 64. Causes generation of read signals from this PAL 66 and is latched through by the 4MN clock. |
| OON: | Inverted phase 0 from APPLE bus. |
| A11: | Inverted Address line 11 from microprocessor 42. |
| CFD: | When gated with EXW generates a timing pulse for system disable. |

As will be understood by those familar with the art, the present invention may be embodied in other specific forms without departing from the spirit or essential characteristics thereof. FIGS. 2 and 3 show a specific embodiment for an APPLE microcomputer. Other embodiments could implement the system of FIG. 1 for IBM or other microcomputers. Accordingly, the disclosure of the preferred embodiment of the invention is intended to be illustrative, but not limiting, of the scope of the invention which is set forth in the following claims.

What is claimed is:

1. A method for enhancing the speed of operation of a computer having a plurality of devices including a first microprocessor coupled to a main memory via an address bus, said computer being designed to operate at a first clock cycle time, comprising the steps of:

providing a cache memory having a faster access time than an access time of said main memory used by said computer;

permanently disabling or disconnecting said first microprocessor on or before power-up;

producing a second clock having a faster cycle time than said first clock cycle time;

providing a second microprocessor operating at said second clock cycle time;

storing a portion of the data of said main memory in said cache memory;

intercepting an addressing of a location in said main memory on said address bus by said fast microprocessor;

producing a signal designating one of a plurality of banks of said main memory in response to the addressing of a location in said main memory by said second microprocessor, each of said banks using the same addresses from said second microprocessor;

determining, in response to said addressing of a location in said main memory, whether the data of said location is stored in said cache memory;

retrieving said data for said fast microprocessor from said cache memory at said faster access time if said data are determined to be in said cache memory; and communicating with said plurality of devices, excluding said first microprocessor, at said first clock cycle time.

2. The method of claim 1 wherein said determining step comprises the steps of:

storing, in a tag memory, a first portion of each of said main memory addresses for data also stored in said cache memory, said data being stored in said cache memory at a location in said cache memory corresponding to a second portion of said main memory address; and comparing a first portion of a current address to said address first portion stored in said tag memory.

3. The method of claim 1 wherein said data is stored in said cache memory upon a first request for said data.

4. The method of claim 3 further comprising the step of eliminating an earlier byte of data stored in a cache memory location upon a request for a byte of data after said cache memory location is filled.

5. The method of claim 1 wherein said disabling step comprises providing a signal to a direct memory access line of said computer.

6. The method of claim 1 further comprising the steps of:

decoding an address to determine the location of said address; and providing a clock speed for said second microprocessor compatible with said location.

7. The method of claim 1 further comprising the steps of:

storing an element of data to be written into said main memory in a buffer during a clock cycle corresponding to said faster access time; and subsequently writing said element of data into said main memory during a slower clock cycle independent of said faster access clock cycle.

8. A method for enhancing the speed of operation of a computer having a plurality of devices including a first microprocessor coupled to a main memory via an address bus, said computer being designed to operate at a first clock cycle time, comprising the steps of:

providing a cache memory having a faster access time than an access time of said main memory used by said computer;

permanently disabling or disconnecting said first microprocessor on or before power-up;

producing a second clock having a faster cycle time than said first clock cycle time;

providing a second microprocessor operating at said second clock cycle time;

storing a portion of the data of said main memory in said cache memory;

intercepting an addressing of a location in said main memory on said address bus by said fast microprocessor;

producing a signal designating one of a plurality of banks of said main memory in response to the addressing of a location in said main memory by said second microprocessor, each of said banks using the same addresses from said second microprocessor;

storing, in a tag memory, a first portion of each of the main memory addresses for data also stored in said cache memory, said data being stored in said cache memory at a location in said cache memory corresponding to a second portion of said main memory address;

comparing a first portion of a current address to said address first portion stored in said tag memory;

retrieving said data from said cache memory if said compared addresses are identical; and communicating with said plurality of devices, excluding said first microprocessor, at said first clock cycle time.

9. An apparatus for enhancing the speed of operation of a computer having a plurality of devices including a first microprocessor and a main memory, said computer being designed to operate at a first clock cycle time, comprising:

means for coupling said apparatus to address and data lines coupled to said first microprocessor and permanently disabling said first microprocessor on or before power-up;

means for communicating with said plurality of devices, excluding said first microprocessor, at said first clock cycle time;

means for producing a second clock having a faster cycle time than said first clock cycle time;

a cache memory having a faster access time than an access time of said main memory used by said computer;

a second microprocessor operating at said second clock cycle time;

means for storing a portion of the data of said main memory in said cache memory;

means for producing a signal designating one of a plurality of banks of said main memory in response to the addressing of a location in said main memory by said second microprocessor, each of said banks using the same addresses from said second microprocessor;

means for determining, in response to the addressing of a location in said main memory by said second microprocessor, whether the data of said location is stored in said cache memory; and means for retrieving said data for said second microprocessor from said cache memory using said second clock if said data are determined to be in said cache memory.

10. The apparatus of claim 9 wherein said means for determining comprises:
a tag memory;
means for storing in said tag memory a first portion of each of said main memory addresses for data stored in said cache memory at a location in said cache memory corresponding to a second portion of said main memory address; and
means for comparing a first portion of a current address to said address first portion stored in said tag memory.

11. The apparatus of claim 9 wherein said data is stored in said cache memory upon a first request for said data.

12. The apparatus of claim 11 further comprising means for eliminating an earlier byte of data stored in a cache memory location upon a request for a byte of data from said main memory after said cache memory location is filled.

13. The apparatus of claim 9 wherein said disabling means comprises means for providing a signal to a direct memory access line of said first microprocessor.

14. The apparatus of claim 9 further comprising:
means for decoding an address from said second microprocessor to determine the location of said address; and
means for providing an addressing sequence clock speed for said second microprocessor compatible with said location.

15. The apparatus of claim 9 further comprising:
a buffer for storing an element of data to be written into said main memory during a clock cycle corresponding to said faster access time; and
means for subsequently writing said element of data into said main memory during a slower clock cycle.

16. An add-on apparatus for enhancing the speed of operation of a computer having a plurality of devices including a first microprocessor and a main memory, said computer being designed to operate at a first clock cycle time, comprising:

means for coupling said apparatus to a first address bus and first data bus coupled to said first microprocessor and permanently disabling said first microprocessor on or before power-up;
means for communicating with said plurality of devices, excluding said first microprocessor, at said first clock cycle time;
means for producing a second clock having a faster cycle time than said first clock cycle time;
a second microprocessor operating at said second clock cycle time;
a cache memory having a faster access time than an access time of said main memory of said computer, said cache memory being smaller than said main memory;
a tag memory for storing a first portion of each main memory address for data also stored in said cache memory, said first address portion being stored in said tag memory at an address corresponding to a second portion of said main memory address;
a comparator for comparing a first portion of a current address with a first address portion stored in said tag memory;
control means for retrieving data for said second microprocessor from said cache memory at said faster access time responsive to said comparator;
a fast data bus, internal to said add-on apparatus, coupled to said second microprocessor and said cache memory;
a fast address bus, internal to said add-on apparatus, coupled to said second microprocessor, said tag memory and said comparator;
means for producing a signal designating one of a plurality of banks of said main memory in response to the addressing of a location in said main memory by said second microprocessor, each of said banks using the same addresses from said second microprocessor;
a first buffer means for coupling said fast data bus to said first data bus of said first microprocessor; and
a second buffer means for coupling said fast address bus to said first address bus of said first microprocessor.

* * * * *